United States Patent [19]

Vogelman

[11] Patent Number: 5,536,375
[45] Date of Patent: Jul. 16, 1996

[54] WATER PURIFIER HAVING A DEMISTER

[75] Inventor: Jonathan C. Vogelman, Racine, Wis.

[73] Assignee: Emerson Electric Co., Racine, Wis.

[21] Appl. No.: 315,186

[22] Filed: Sep. 29, 1994

Related U.S. Application Data

[63] Continuation of Ser. No. 120,152, Sep. 10, 1993, abandoned.

[51] Int. Cl.$^6$ ................................ B01D 3/10; B01D 3/42
[52] U.S. Cl. ................................ 203/2; 202/160; 202/182;
202/197; 202/202; 202/205; 203/11; 203/40;
203/94; 203/98; 392/331; 392/342
[58] Field of Search ........................ 202/197, 160,
202/202, 206, 205, 182; 203/11, 2, 1, 10,
40, DIG. 18, 94, 100, 98; 392/482, 331,
342; 159/DIG. 2, DIG. 16

[56] References Cited

U.S. PATENT DOCUMENTS

| | | | |
|---|---|---|---|
| 2,956,934 | 10/1960 | Waddill | 202/197 |
| 3,212,232 | 10/1965 | McMinn | 202/197 |
| 3,334,027 | 8/1967 | Goeldner | 202/197 |
| 3,736,234 | 5/1973 | Miyamoto | 202/197 |
| 3,826,718 | 7/1974 | Takayasu | 202/197 |
| 4,045,293 | 8/1977 | Cooksley | 202/197 |
| 4,096,039 | 6/1978 | Carnine et al. | 203/2 |
| 4,110,088 | 8/1978 | Cold et al. | 55/233 |
| 4,181,577 | 1/1980 | Foley | 202/181 |
| 4,412,887 | 11/1983 | Dye | 202/197 |
| 4,509,591 | 4/1985 | Kala | 261/151 |
| 4,734,167 | 3/1988 | Goeldner | 202/182 |
| 4,767,502 | 8/1988 | Santasalo et al. | 202/197 |
| 4,933,047 | 6/1990 | Bannon | 202/197 |
| 4,938,868 | 7/1990 | Nelson | 202/197 |
| 4,985,122 | 1/1991 | Spencer | 202/202 |
| 5,028,298 | 7/1991 | Baba et al. | 203/40 |
| 5,200,039 | 4/1993 | Weber et al. | 202/197 |
| 5,211,816 | 5/1993 | Youngner | 202/197 |
| 5,248,394 | 9/1993 | Schlesinger et al. | 202/197 |

FOREIGN PATENT DOCUMENTS

| | | | |
|---|---|---|---|
| 4036437 | 5/1992 | Germany | 203/10 |
| 0546414 | 7/1942 | United Kingdom | 203/40 |
| 0823915 | 11/1959 | United Kingdom | 202/197 |

*Primary Examiner*—Virginia Manoharan
*Attorney, Agent, or Firm*—Ryan, Maki, Mann & Hohenfeldt

[57] ABSTRACT

A distiller for producing potable water employs a metal boiler tray having a cover member in which there is an inlet for raw water and which together form a steam chamber having an outlet for steam. The boiler tray bottom has a plurality of steps including a highest, an intermediate and a lowest level step which are all covered with water at the beginning of a distillation cycle. The temperature of the highest level step is monitored with a sensor. A rise in the temperature of the highest level step by a predetermined amount above the boiling temperature of water indicates that the highest and intermediate level steps have become dry. This results in a signal to a controller to open a valve and admit replenishment raw water whose amount is dependent on valve open time. Steam evolved from the boiler tray is conducted through a first check valve in the cover member to demister chamber when the mist or carryover water in the steam impinges on a baffle and is separated from the steam as condensate. A feedback tube having a check valve interconnects the demister chamber with the steam chamber so that negative pressure in the steam chamber that accompanies infeed of cool raw water causes the condensate to be withdrawn from the demister chamber and returned to the boiler chamber.

8 Claims, 7 Drawing Sheets

WATER PURIFIER HAVING A DEMISTER

This is a continuation of copending application Ser. No. 08/120,152 filed on Sep. 10, 1993, now abandoned.

BACKGROUND OF THE INVENTION

The invention disclosed herein pertains to distillers for producing potable water from impure water.

Typical distillers used in residences for water purification comprise a boiler to which impure (raw) water is admitted from the water mains for being converted to steam. The heat for effecting conversion of raw water to steam is usually an electric heater element which, in some designs, is immersed in water within the boiler and in other designs is arranged in heat exchange contact with an external surface of the boiler. The generated steam is conducted from the boiler to the inlet of a steam condenser which is usually cooled externally by an air stream from a fan. Typically, the pure condensate is delivered to a storage tank. A motor-driven pump is usually present in the distiller assembly for delivering water from storage to a faucet on demand.

Residential water distillers can be technically quite sophisticated as is demonstrated in U.S. Pat. Nos. 5,110,419; 5,188,710; and 5,200,039 which are assigned to the assignee of this application and are incorporated herein by reference. The distillers described in these patents are adapted to perform a variety of control functions of which the owner does not have to be aware. An electronic controller, which may be based on a microprocessor, governs the functions. For example, a sensor such as a float switch signals the controller when the quantity of pure water in the storage tank is low, in which case the controller responds by switching the heater element on and, possibly, at the same time opens a raw water infeed valve and adds water to the boiler for being converted to steam. A sensor may detect the temperature of the heater element as a representation of the depth of water in the boiler so as to independently close the infeed valve or open it as required to repeat a steam production cycle. Data representative of the total run time of the distiller may be accumulated in an electronic memory which provides a signal to the distiller owner that certain maintenance steps must be taken such as removal of mineral deposits from the boiler-evaporator and/or the heater element.

Generally, existing distillers perform their functions in a pre-determined order. At start up, the heater element may be energized for a short time interval to bring the element or boiler up to near steam generating temperature. Next, raw water that is to be distilled and purified, is admitted to the boiler and, in a short time, generation of steam starts. Continuing evaporation of the water in the boiler results in a drop in the water level. The low level water condition is sensed and the response to the condition must be replenishment of raw water in the boiler.

A problem in pre-existing distillers is that precise correlation between boiler or heater element temperature and a demand for water infeed cannot be obtained. One of the reasons is that as long as there is some water in contact with the boiler body or with the heater element, the body or element tends to remain at the 212° F. or 100° C. of the boiling water. Hence, there is no sensible increase in the temperature of the heater element nor in the steam boiler body above the boiling temperature of water until the boiler or heater element becomes totally dry. Sensing of a temperature above the boiling point of water as an indication of the boiler having gone dry induces a controller to respond by opening a raw water infeed valve. The consequences are unfavorable. The first incoming quantity of raw water runs onto a surface that is significantly hotter than the minimum temperature that is necessary to generate steam. This results in the raw water flashing into steam with explosive force accompanied by a substantial increase in the steam pressure within the boiler. The pressure rise can be so rapid that the steam cannot be relieved fast enough to the condenser to avoid damage to the boiler and even to other parts of the distiller within the distiller housing. This problem and other problems in existing water distillers are eliminated by the invention disclosed herein. Whenever water boils vigorously, as it often does in the small boilers used in residential distillers, tiny microglobules of water characterized as mist, become entrained in and can be carried in the steam from the boiler. There is a probability of the mist or globules containing impurities because the water is just propelled out of the raw water in the boiler. Avoiding the steam flashing problem just discussed removes one cause of mist production. It is important to make sure that no impure carryover water in the form of mist or microglobules can ever reach the condenser and get into the distilled water storage tank. The invention disclosed herein solves this problem, too.

SUMMARY OF THE INVENTION

An objective of the invention is to provide for sensing a temperature on or in the boiler tray from which water is boiled and evaporated into the boiler steam chamber, which temperature is accurately correlated with the need for infeed or replenishment of raw water even though the entire boiler tray has not become dry.

Another objective is to configure the boiler tray in such manner that it provides a zone wherein temperature indicative of the need to add raw water can be sensed while there is some boiling water remaining in the tray and where the zone is adequately, thermally isolated from that part of the tray in which the water is still boiling.

Another objective is to provide a boiler tray in which there is a recess that always retains some residual boiling water so that when there is an infeed of raw replenishment water the latter is discharged into the boiler tray on a surface that is not so hot that the raw water might flash violently into steam. This objective is achieved by reason of providing a boiler tray whose interior bottom is formed in a multiplicity of steps or levels, so that water may be completely evaporated from one or two of the higher level steps and yet have some water remaining in the recess created by the lowest level step when infeed of replenishment of raw water begins.

Another feature of the improved distiller design disclosed herein is to compel the steam that is discharged from the boiler to pass through a condensate separator or demister wherein water is separated from the steam before the steam leaves for the condenser and to provide for automatically drawing the condensate collected in the demister back into the boiler tray under the influence of negative pressure created in the boiler chamber when cold raw water is injected into it. The demister features having spaced apart pin electrodes presented interiorly of it. The voltage drop across the pins is continuously monitored. If something happens that results in the demister chamber filling with condensate or overflow water, a voltage change is detected between electrode pins and a microprocessor based controller responds to the corresponding signal by shutting down the distiller completely.

The distiller disclosed herein also features carrying the boiler tray in a carriage that is detachably connected to the distiller housing door such that by closing the door, the carriage and tray are advanced into the housing for the leading end of the carriage to encounter a ramp. The ramp forces the carriage and tray in it to rise so that the tray effects a sealed connection with a cover or dome that is fixed in the distiller housing, thereby developing an enclosed boiler steam chamber. This feature is known per se as illustrated in the previously cited patents of the assignee hereof. However, the boiler tray for the distiller disclosed herein is preferably an aluminum or an aluminum alloy casting which has the heater element attached to its exterior bottom with two electrical connector prongs extending from the tray. A downwardly biased movable electrical connector is positioned in the distiller housing for supplying electric power to the heater element. When the boiler tray is advanced into the housing as explained, the heater element prongs first become inserted in the movable connector when the carriage and boiler tray are still not lifted by the ramp. Then, as the leading end of the boiler tray is advanced further onto the ramp, and is lifted, the movable connector is also lifted and the prongs are plugged in soundly to make a good electrical connection. The trailing end of the tray is lifted correspondingly with the lift of the leading end by the ramp as a result of the trailing end being connected to the door so when the door closes, the trailing end rises.

According to the invention, the boiler tray has an interior bottom in which there is a plurality of levels or steps, three steps in the preferred embodiment, such as a succession of highest, intermediate and lowest level steps. Thus, water varies in depth from the least depth above the highest level step to the greatest depth above the lowest level step. A valve is controllable to initiate and terminate infeed of raw replenishment water to the boiler tray within a pre-set time interval measured by the microprocessor based controller. A probe containing a temperature sensor is carried by the electrical connector mentioned in the preceding paragraph. Concurrently to its making of the electric power connection to the prongs of the heater element, the probe on the connector is also inserted in the tray in a complementarily-shaped hole such that the sensor is positioned for sensing the temperature primarily of the highest step surface in the tray bottom. Eventually, enough water is evaporated from the highest level step for that step to become dry. This is followed by the intermediate level step becoming dry. According to the invention, water is still boiling in the recess defined by the sidewalls of the tray and the lowest level step continues to boil at 100° C. and yield steam. Because the dry steps get hotter with time, the controller receives a signal that is representative of an increasingly higher temperature from the sensor in the probe. When this signal reaches a predetermined value, the controller responds by opening the raw water infeed valve and cool raw water flows into the boiler tray. The raw water can be directed onto the dry intermediate step in the tray bottom since that surface will be only slightly higher than the boiling temperature of water because it is in heat conductive relationship with the lowest step wherein water is still boiling and tending to keep the temperature of the intermediate step close to the boiling point of water. On the other hand, because of the remoteness of the highest level step from the boiling water, that step increases in temperature more than the intermediate step so it reflects that the highest and intermediate steps or levels are dry and that infeed of water is called for. The replenishing infeed water is metered for a measured time interval that is sufficient for raw water to cover the intermediate and highest level steps in the bottom of the boiler tray before the raw water infeed solenoid controlled valve is closed. Because of the intermediate step being close to the temperature of boiling water when infeed of replenishment water begins, the infeed water does not flash into steam but is converted into steam after a slight delay during which all of the water in the tray begins to boil.

How the foregoing and other specific objectives and features of the invention are implemented will be evident in the ensuing more detailed description of a preferred embodiment of the invention which will now be set forth in reference to the drawings.

DESCRIPTION OF THE DRAWINGS

FIG. 4 is an end elevational view of the boiler tray carrier as viewed in the direction of the arrows 4—4 in. FIG. 3;

DESCRIPTION OF A PREFERRED EMBODIMENT

Figure 1:
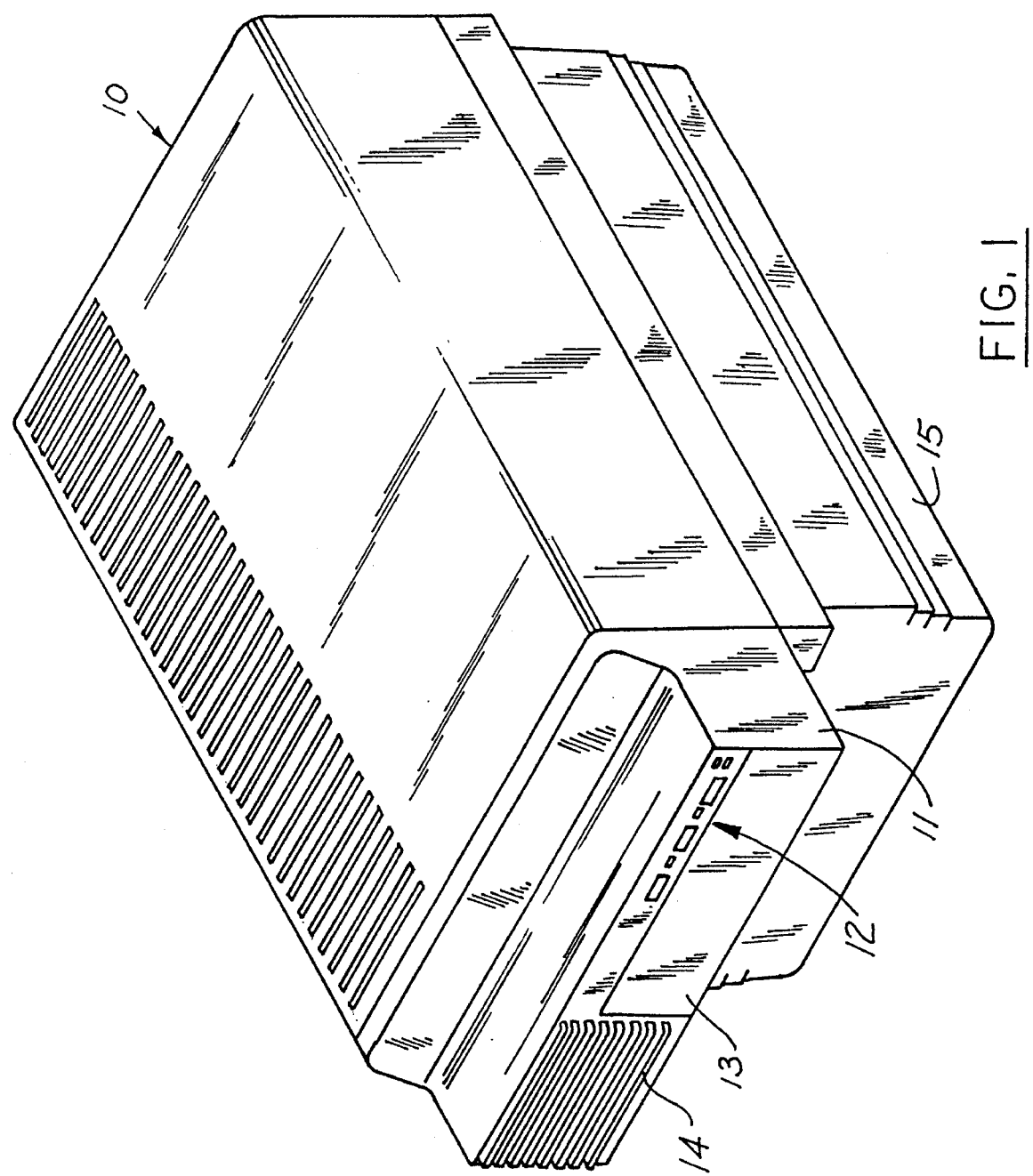
FIG. 1 is a perspective view of the improved water distiller as it appears when ready for installation in the owner's kitchen cabinetry.

Attention is invited to FIG. 1 which is a perspective view of the improved distiller ready for installation in a home for supplying purified potable water. The distiller is comprised of a cabinet or housing 10 to which a front-end housing section 11 is attached. Housing section 11 has on its face an array of push-button switches, a door latch actuator button, and distiller status indicator lights which are collectively identified by the numeral 12. The housing section 11 also has a door 13 that pivots about a horizontal axis to provide for inserting into the housing and for withdrawing a steam boiler evaporator tray from the housing for inspection and cleaning. The tray is not visible in FIG. 1 but its structure and function will be exhibited and described in detail later.

The front section 11 also has a grill 14 for discharging from the housing cooling air after it has passed over a steam condenser in the housing under the influence of a motor-driven fan, neither of which are visible in FIG. 1. A tank 15 in which the purified distilled water is stored is releasably mounted to the base member which is concealed in the housing in FIG. 1.

Figure 2:
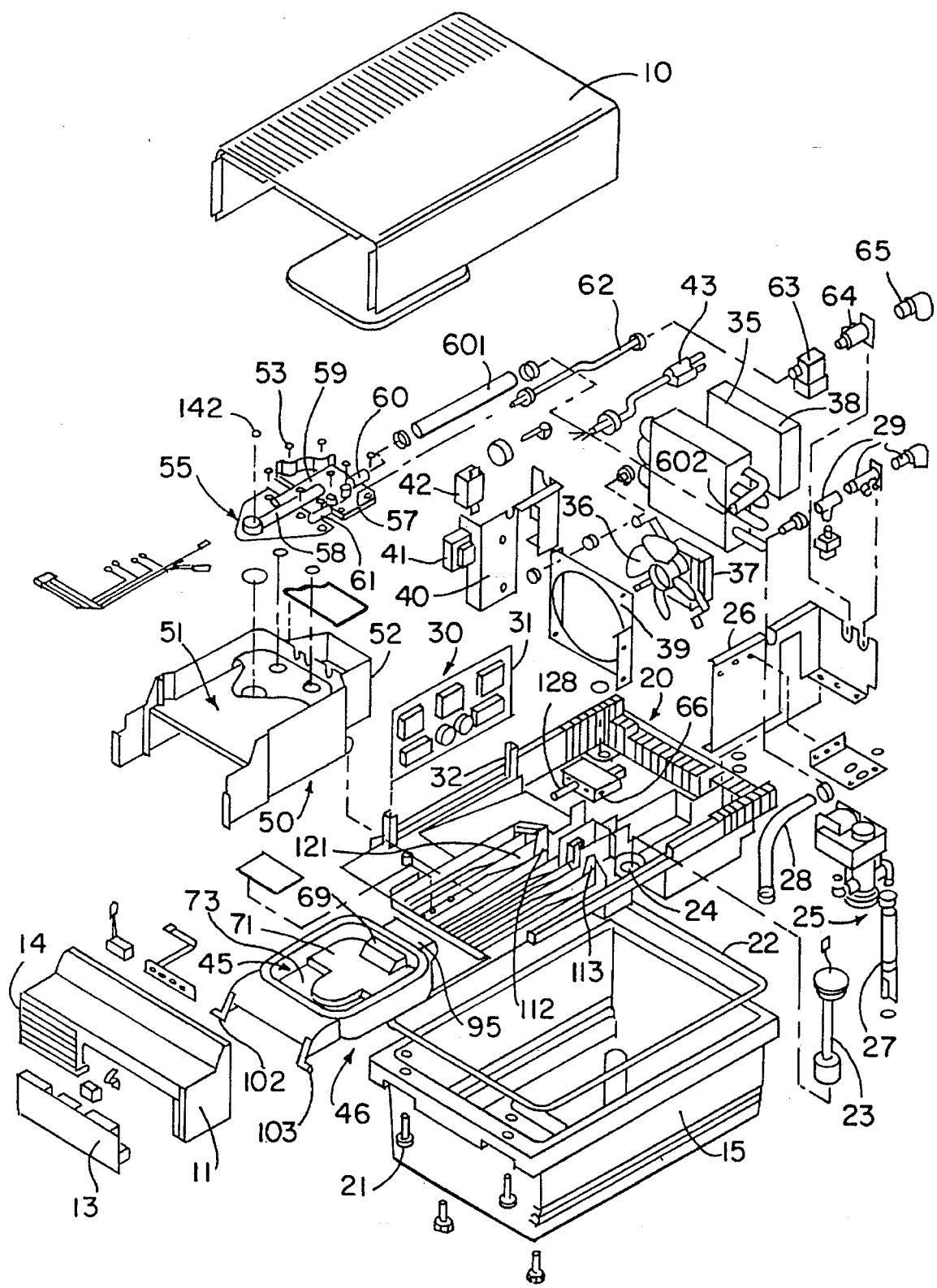
FIG. 2 is an exploded view of the distiller.

Major parts of the distiller not thus far identified are identified in reference to the FIG. 2 exploded view. The horizontally disposed base member of the distiller is identified generally by the numeral 20. The previously mentioned purified water storage tank 15 is secured to a base member 20 with thumbscrews 21 and a gasket 22 is interposed between the tank and base member. A sensor 23 mounts in a base hole 24 and extends into tank 15 for providing a signal or signals indicative of the water level in the storage tank. A motor and pump unit 25 is mounted to the base 20 by way of a multiple purpose bracket 26. The pump has an intake tube 27 for drawing water from storage tank 15 and an output tube 28 for delivering water to a faucet, not shown. Water is conducted to the faucet through fittings and a pressure sensor which are shown as five parts that are collectively designated by the number 29. These components may be seen in any of the three patents cited earlier.

A microprocessor based controller and intelligence center 30 for the distiller is symbolized by the circuit board 31 which has the microprocessor, integrated circuits and other electronic components mounted to it. Certain circuits and control functions governed by controller 30 which are pertinent to the invention disclosed herein will be discussed later as required. The controller 30 circuit board 31 is retained in slotted posts 32 projecting upwardly from distiller base member 20.

Continuing with mentioning the principal components of the distiller, FIG. 2 also shows a conventional steam condenser 35 comprised of a tubular coil and fins for condensing steam generated in the distiller to water.

Coolant air is drawn through condenser 35 under the influence of a fan 36 driven by an electric motor 37. Before the coolant air stream enters condenser 35, the air passes through a filter 38. The fan 36 and the motor 37 combination is mounted to an apertured plate 39 which mounts to base member 20. Brackets such as the one marked 40 are provided for mounting members such as electrical components 41 and 42. The electric power input supply cord to the distiller and its attachment plug is designated generally by the numeral 43.

The components of the distiller thus far described are also present in the three patents of the assignee mentioned earlier in the specification.

The pre-existing distiller design employs a raw water boiler tray for producing steam and for accumulating biological contaminants and mineral sediment extracted from the water. The predecessor designs also mount the boiler tray in a carrier that facilitates inserting the tray into the distiller housing and withdrawing it from the housing. The new boiler tray is indicated generally by the numeral 45 in FIG. 2 and the new carrier is designated generally by the numeral 46. The distinctive structural and functional features of the new tray 45 and carrier 46 will be discussed later.

As in the previously cited patents, there is shown in FIG. 2 a support frame or shroud 50 in which a boiler tray cover member, generally designated by the numeral 51 is mounted integrally. The cover member 51 is, according to the invention, integrated with a demister chamber 52 which has novel structural and functional features that will be described in detail later. Boiler cover member 51 is fixedly mounted on distiller base member 20 through the agency of shroud 50 as was the case in the cited earlier patented designs. When carrier 46 is inserted into distiller housing 10 with the boiler tray 45 mounted in the carrier 46 and the carrier is sliding along base member 20, the carrier and boiler tray 45 become elevated so that the upper rim of the tray makes a sealed connection with the bottom of the downwardly concave cover member 51. Thus, cover member 51 and boiler tray 45 cooperate to define an enclosed steam chamber which will be discussed in more detail later.

FIG. 2 also depicts a newly designed tube manifold that is designated generally by the numeral 55. An enlarged view of the manifold 55 is presented in FIG. 10. Tube manifold 55 has a portion 56 that interfaces sealingly with the top of the boiler cover member 51 and is secured thereon with screws such as the one marked 53. The manifold also has a portion that is sealingly interfaced with the demister chamber 52. Tube 58 on the manifold conducts steam from the steam chamber or boiler to the demister chamber 52 which separates particulate water globules or mist that is carried over with the steam and which must be prevented from going to the condenser since the mist may contain solids. The steam, after having the mist removed, is discharged from demister 52 through a tube 60 that is connected by means of a hose 601 to the inlet 602 of condenser 35. Another tube 59 on the manifold is for returning condensate collected in the demister back into the steam chamber for reprocessing. This process will be discussed in detail later. The third tube 61 on the tube manifold 55 is for admitting unprocessed raw water to the steam chamber that is defined by the cover member 51 and boiler tray 45 which is sealingly engaged with the cover member. Raw water infeed tube 61 on tube manifold 55 connects by way of a tube 62 to the outlet of a flow restricter 63. Flow restricter 63 has a raw water inflow from the outlet of an electrically controlled raw water infeed solenoid valve 64 whose inlet connects to an elbow 65. The elbow connects to a pipe, not shown, which connects to the water distribution system in the building.

In FIG. 2, a movable electrical connector assembly 66 is depicted above the distiller base 20. This connector supplies electric power for heating the boiler tray 45. A probe 128 extends from the connector and contains a temperature responsive sensor, not visible, as will be elaborated later.

Figure 5:
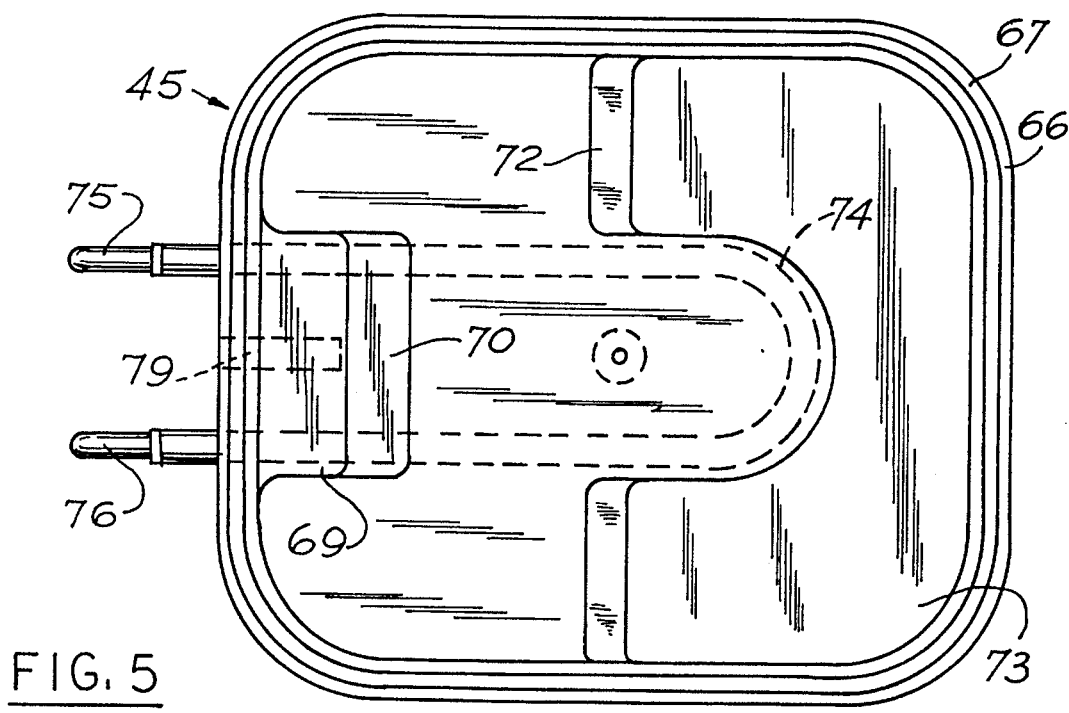
FIG. 5 is a top plan view, that is, an inside view of the electrically heated boiler tray that is used in the distiller to convert water to steam.
Figure 6:
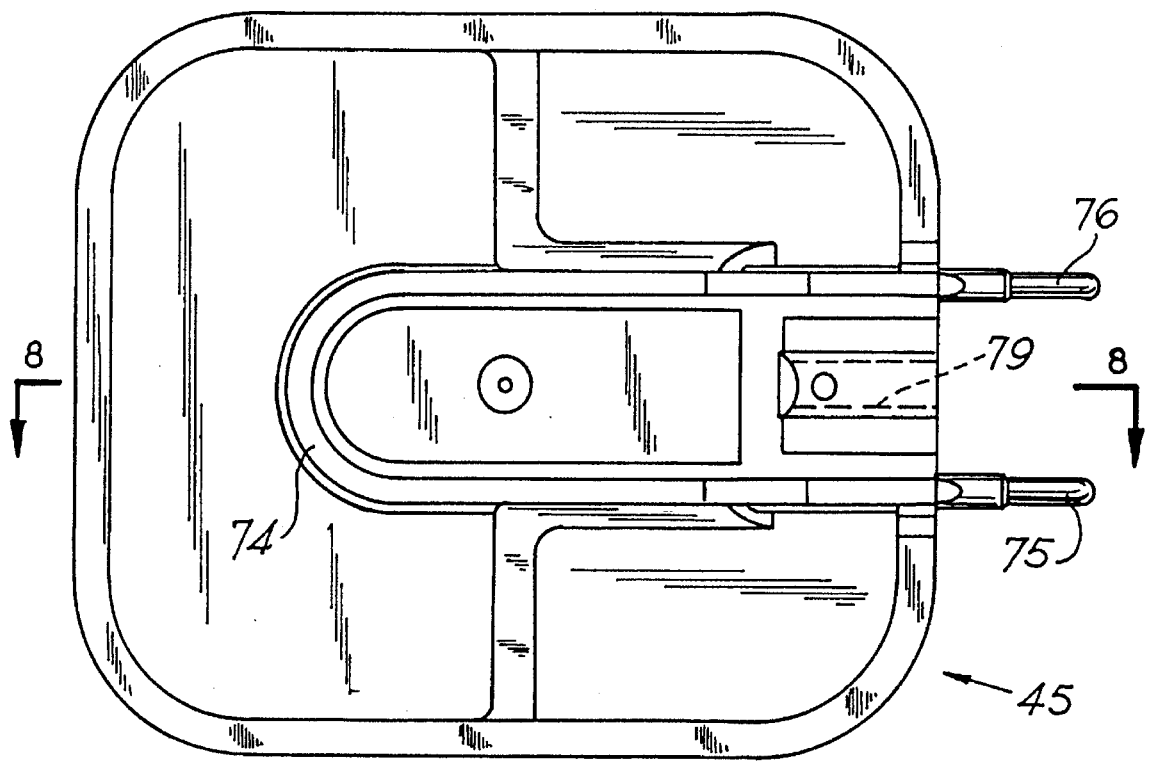
FIG. 6 is a bottom plan view of the boiler tray.
Figure 7:
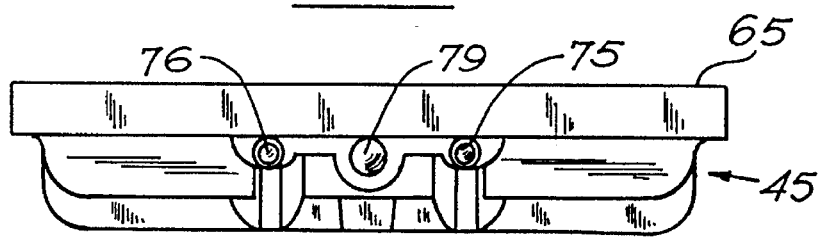
FIG. 7 is a right side elevational view of the boiler tray depicted in FIG. 6.
Figure 8:
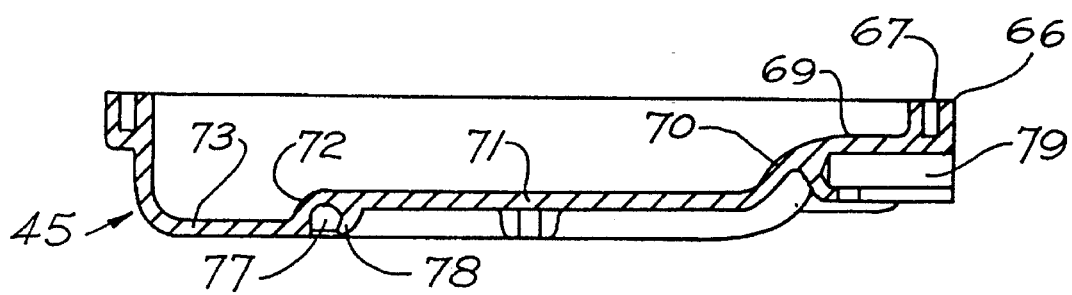
FIG. 8 is a sectional view of the boiler tray looking through a vertical plane in the direction of the arrows 8—8 in FIG. 6, the tray standing in its upright water holding position rather than appearing inverted as in FIG. 3 and the electric heater element associated with the tray being omitted.
Figure 9:
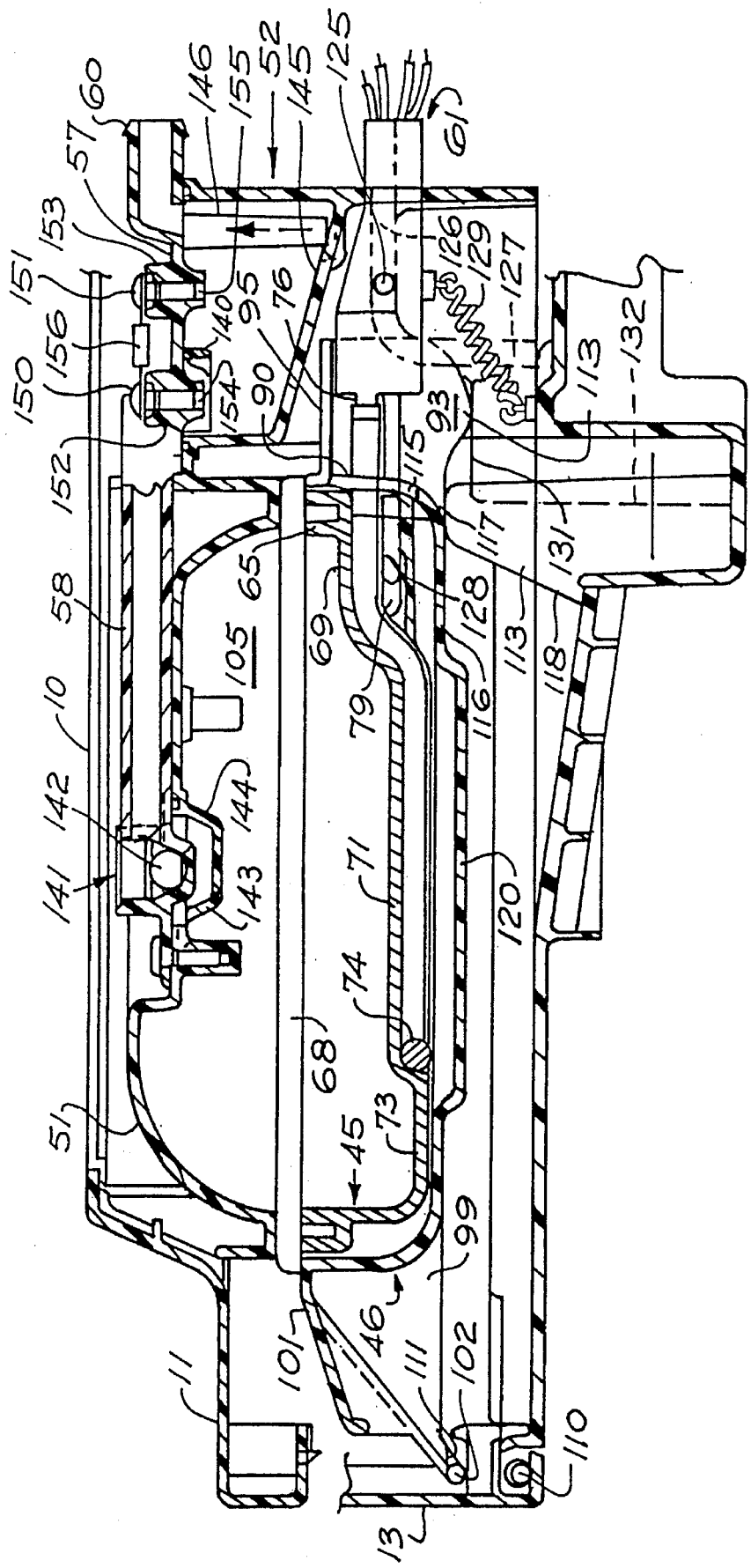
FIG. 9 is a vertical sectional view of the boiler tray, the boiler carrier, the boiler cover member, the tube manifold and some other parts of the distiller.

The features of the improved boiler tray 45 will now be described in detail in reference to FIGS. 5–8 primarily. The tray 45 is preferably a cast aluminum member. In the FIG. 5 plan view, one may see that the boiler tray 45 is comprised of a generally rectangular rim 66 which encompasses a recess for containing water that is to be converted to steam. The recess defined by rim 66 is evident from inspection of the FIG. 8 vertical section of the boiler tray 45. The rim has a perimetral groove 66 which augments the sealing effectiveness of a gasket 68 that is shown in FIG. 9 where the boiler tray 45 is shown interfaced with the cover member or dome 51 that defines the steam chamber 105 in conjunction with the boiler tray 45. The interior bottom of boiler tray 45 as shown in FIGS. 5 and 8 is formed with a plurality of levels or steps, particularly, three steps in the illustrated embodiment. The highest level step is marked 69. This step has a riser 70 which connects the highest level step 69 with the next lower or intermediate level step 71 in the boiler tray bottom. Step 71 has a riser 72 which connects intermediate step 71 with the lowest level step 73 in the boiler tray bottom. As one may observe in FIG. 5, the lowest level step 73 constitutes the bottom of a U-shaped recess or sump which can contain a substantial quantity of water. It should be evident from inspection of FIG. 8 that if boiler tray 45 were about half full of water, the depth of water above the highest level step 69 would be less than the depth of water over intermediate step 71. The depth of water over the lowest level step would be greater than the depth of water over intermediate step 71 and over the highest level step 69. The interior of the boiler tray 45 including the three steps is coated with a non-stick material. Polytetrafluoroethylene is an example. The non-stick coating acts as a release layer for the residual sediment and mineral that remains after the raw water is boiled out of the boiler tray. It is important to note that if the boiler tray 45 were filled with water in the first instance and then heated continuously to convert the water to steam without adding water, the highest level bottom step 69 would become dry first and the intermediate level step 71 would become dry next. Even though the highest level step 69 and the intermediate level step 71 would have gone dry, boiling water could still remain in the recess that has the lowest level step 73. The three levels or steps in the bottom of the boiler tray are utilized, in accordance with the invention, to participate in overcoming the problem of raw infeed water flashing into steam with explosive force and replenishment raw water is fed into the boiler tray as mentioned earlier.

The top plan view of the boiler tray 45 in FIG. 5 shows in dashed lines the U-shaped configuration of the electric heater element 74 which is energized when required to provide the heat for evaporating water from the boiler tray and converting it to steam. Heater element 74 terminates in two conductive connector prongs 75. The FIG. 6 bottom view of boiler tray 45 shows that the heater element 74 is in intimate heat exchange relationship with the exterior boiler tray bottom and the element 74 resides in a correspondingly shaped groove. In FIG. 8, where the heater element 74 is not yet installed in the boiler tray, one may see an empty groove 77 of a size for receiving a heater element. A lip 78 forms one side of the groove. After the heater element is installed in groove 77, lip 78 is crimped to hold the heater element in place.

One may see in FIGS. 5–8 that boiler tray 45 has a bore 79 underlying the highest level step 69 in the boiler tray 45 bottom. As will be discussed in more detail later, bore 79 is provided for receiving probe 128 on connector 66 which was discussed earlier in .reference to FIG. 2. As mentioned earlier, there is a temperature sensor, not visible, in probe 128 although the probe is shown in FIG. 9. The sensor, not visible, is involved in determining the proper time for opening the raw water infeed valve 64 shown in FIG. 2 for adding water to the boiler tray 45 during distiller operation without having the infeed raw water flash into steam with explosive force.

Figure 3:
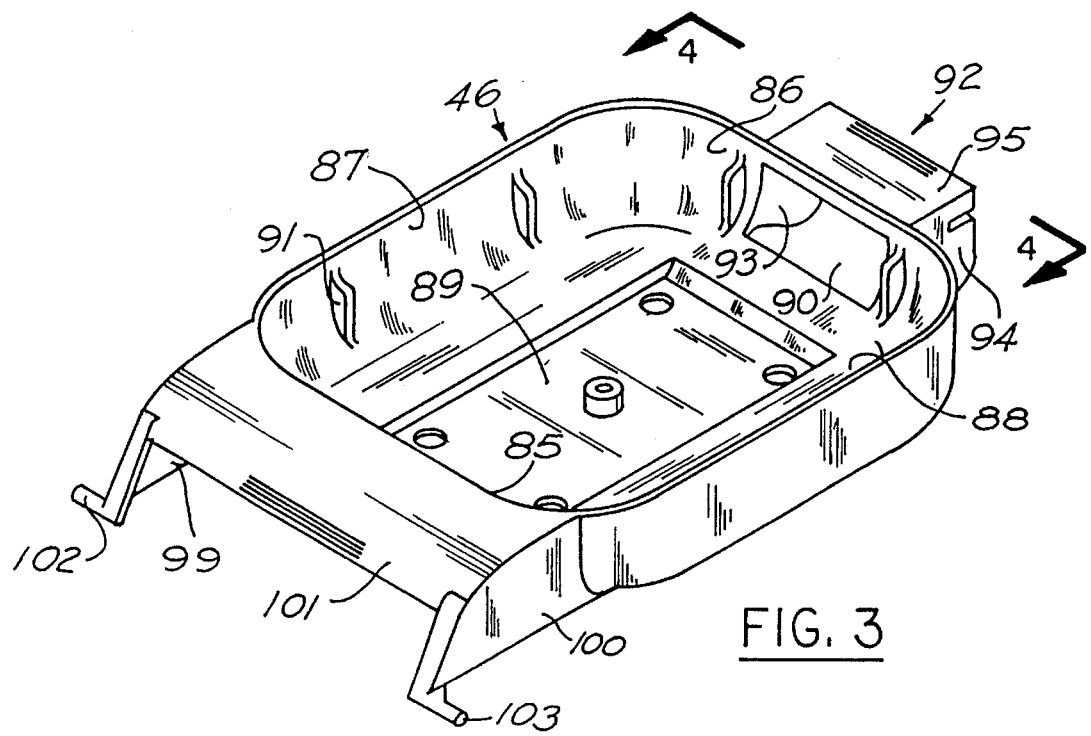
FIG. 3 is a perspective view of a carrier member for the water boiler tray used in the distiller, the tray having been omitted.
Figure 4:
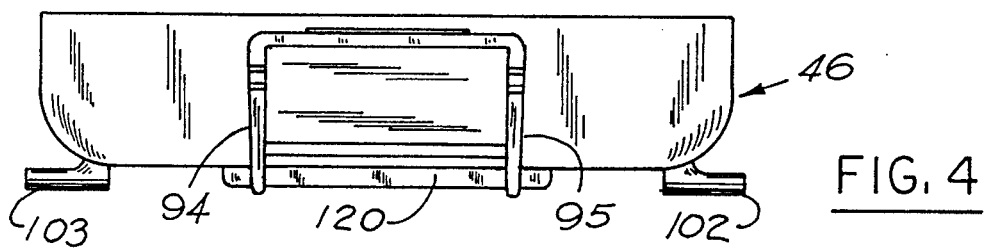

The carrier 46 for the boiler tray 45 is shown isolated from the distiller in FIGS. 3 and 4. Carrier 46 may be, and preferably is, molded from a low thermal conductivity plastic material. The carrier has a front or trailing end wall 85 and a rear or leading end wall 86 plus side walls 87 and 88. A bottom recess 89 can provide room for a thermal insulating mat, not shown, under the bottom of the electrically heated boiler tray 45. The rear or leading end wall 86 of the carrier has an opening 90 to which the connector prongs 75 and 76 of the boiler tray heater element can project. The boiler tray 45 is stabilized within carrier 46 by resting on ribs such as the one marked 91. On the outside of the rear wall 86 of the tray carrier 46 and formed integrally with the carrier body is a guide member 92 that has a flat top 95 which can be used as a handle for handling the carrier when it is retracted from the distiller housing. Handle member 95 spans between two runners 93 and 94 which are involved in the process of effecting a connection between connector body 66 with probe 128 and the two prongs 75 and 76 which extend from the boiler tray heater element 74. The runners 93 and 94 have a special curved configuration as can be seen in FIG. 9 where one runner, 93, is visible. Involvement of the runners in making the electrical connection between movable or floating connector 66 and the electrical heater element will be described shortly hereinafter.

As shown in FIGS. 3 and 4, the front or trailing end of carrier 46 is provided with longitudinally extending webs 99 and 100 which are bridged and stiffened by a handle member 101. The webs and curved handle member 101 are molded integrally with the front or trailing end of the carrier. Pins 102 and 103 extend laterally outwardly from the respective webs 99 and 100. Pins 102 and 103 participate in the function of inserting the carrier 46 into the distiller housing and also in lifting the rear end of the carrier 46 as the front end is lifted, when the carrier is inserted in the distiller housing, by means of the outer surface of the leading end wall 86 of the carrier riding on some ramps 112 which are visible particularly well in FIG. 2.

Attention is now invited to FIG. 9 which shows the boiler tray 45 elevated into sealed relationship with the fixedly mounted steam chamber cover or dome 51 for creating a steam collection chamber 105. A gasket 68 is interposed between the boiler tray 45 and chamber cover 51. Tray 45 is in carrier 46 and is securely pressed upwardly to effect a good seal. Provision is made for elevating the carrier 46 in a level state as it advances into the distiller housing. Front door 13 of housing section 11 referred to in reference to FIG. 2 is involved with insertion of an elevation of boiler tray 45 into sealing relationship with steam chamber cover 51. Front door 13 on housing section 11 pivots to open and closed position on laterally extending pins one of which, 110, is visible in FIG. 9. As explained in reference to FIG. 3, tray carrier 46 has pins 102 and 103 extending laterally in opposite directions at the front or trailing end of the carrier 46. Pin 102 is visible in FIG. 9 where it is shown residing in a notch or slot 111 in door 13. Pin 103 on a carrier would also extend into a slot similar 111, but this pin is not visible because it is taken from the forefront in the FIG. 9 sectional view. Door 13 is presently shown in FIG. 9 in its closed position as a result of which the front end of carrier tray 46 is forced upwardly to cause compression of gasket 68 while the leading end of tray 45 is supported on a flat surface 117 of a post 113 after the tray has been caused to rise when it is being inserted along the ramp surface 118. It should be apparent in FIG. 9 that if the door were open by swinging it counter-clockwise to about 90° degrees, the engagement of pins 102 and 103 in door notches 111 would result in carrier 46 and boiler tray 45 thereon being partially withdrawn from the distiller housing and being accessible for complete withdrawal for maintenance of the tray such as for removal of sediment.

In FIG. 9, the leading or rear end of the carrier 46 exhibits a large radius curvature 115. The curved portion is confluent with a straight bottom face portion 116 which bears on the horizontal top edge 117 of the ramp members 112 and 113. Only ramp member 113 is visible in FIG. 9, but the other ramp member 112 can be seen in FIG. 2. If, in FIG. 9, the door 13 were swung counter-clockwise, the rear end of the carrier which exhibits a large radius curved portion 115 would descend along the ramp surface 118 due to the carrier being drawn outwardly from the housing by a certain amount as a result of the swinging of the door. The curved portion 115 of the carrier 46 is confluent with a straight bottom face portion 116 which bears on the horizontal top edge 117 of the ramp members 112 and 113. Only ramp member 113 is visible in FIG. 9, but the other member 112 can be seen in FIG. 2. If the front door 13 is swung counter-clockwise on pivot pin 110 and its counterpart, the lateral pins 102 and 103 on the boiler tray being engaged in slots 111 on the door, will travel through an arc which has a vector component that causes the front end of the carrier to descend and a vector component that causes the front end of the carrier to begin extending from the distiller housing. This provides access to the carrier 46 handle 101 for completely withdrawing the carrier 46 and boiler tray 45 therein out of the distiller housing. While the door is swinging counter-clockwise and maintaining the trailing or front end of the carrier at a predetermined level, the curved cam surface 115 on the carrier 46 rides onto the angulated ramp surface 118 which guides the rear end of the carrier in its descent. The angle of the ramp surface 118 at the rear end of the carrier and the radius of the arc to which the lateral pins 102 and 103 swing are correlated such that the carrier 46 and tray 45 are kept level during carrier and tray retraction, so if there is water in the boiler tray 45, there will be no spill. According to the invention, the door 13 is secured in locked position for a period of time that makes certain the temperature of the carrier and tray is low enough to handle with bare hands without being burned.

After the sediment and mineral deposits have been brushed out of the boiler tray 45, the tray can be inserted in the carrier, and the carrier can be installed in the cabinet again for resumption of the distilling process. Restoring carrier 46 with boiler tray 45 in it into the distiller housing requires that the front door 13 be open far enough for inserting the carrier and boiler tray in the housing 10. While the door is open, carrier pins 102 and 103 are caused to register in the door slots 111. At this time the curved leading end portion 115 of the carrier is proximate to the 113, but the carrier has not begun its ascent. Then, by closing the door 13 to its vertical position as it appears in FIG. 9, the front end or trailing end of the carrier is lifted and urged inwardly by the door while the leading or rear end of the carrier portion 115 rides rearwardly and upwardly on the inclined part 118 of ramp member 113. The carrier 146 and the boiler tray stay level while being elevated by the swinging door at one end and the ramp at the other end, and the rim 65 of the boiler comes up squarely or level to compress gasket 68 and seal the boiler tray to the steam chamber cover member 51.

Observe in FIG. 9 that the carrier 46 has a depressed region 120. The depressed region 120 is also visible in FIG. 4 where it is shown centered with the carrier and as having a width less than the width of the carrier 46. The depressed region 120 constitutes a guide which assures that the carrier will move along a straight pre-determined path when the carrier is inserted into and withdrawn from the distiller. As shown in FIG. 2, the distiller base 20 has tracks 121 which bound the sides of the depression guide for steering the carrier 46 straight into the distiller housing.

When describing the carrier earlier in reference to FIGS. 3 and 4, the opening 90 at the rear end of the carrier was mentioned as were the laterally separated webs or runners 93 and 94. The purpose of the runners will be expanded in reference to FIG. 9.

FIG. 9 shows the movable electrical connector and probe assembly 66 which was depicted in FIG. 2. Connector 66 has laterally extending guide pins such as the one marked 125 in FIG. 9. Pin 125 presently resides in the horizontal part 126 of a guide that curves into a vertical part 127. Thus, the connector 66 has vertical and horizontal components of movement. Biasing means such as a pair of springs, one of which 129, is visible in FIG. 9 and is presently loaded in tension with the result that it tends to urge the connector 66 forwardly, that is, to the left, and downwardly. This movement is precluded by the heater element connector pins 75 and 76 being plugged into the connector 66 and the temperature probe 128 being inserted in hole or socket 79 in the boiler tray. As indicated earlier, the probe contains a temperature sensor, not visible, that established under the highest level step 69 of the boiler tray 45 bottom. The web or curved runner 130 the curved portion of runner or web 93 presently rests on the top 131 of the riser or support member 132. The other runner 94 would be similarly supported in the actual construction. When the tray carrier 46 and the boiler tray 45 are retracted by partial opening of the front door 13 of the distiller housing as previously explained, runner 93 glides off support surface 131 to allow the connector to descend under the force of spring 129 and then stop. The connector stays in its lowermost stopped position after the heater connector pins 75 and 76 are withdrawn from connector 66 and the boiler tray separates from probe 129 as the carrier is withdrawn from the distiller housing 10.

During the restoration of the carrier 46 and the tray 45 in it to the distiller, the electrical connector prongs 75 and 76 on the heater element begin entry into connector 66 when the connector is in its lowermost position and at the time the temperature probe 128 begins entry into the tray hole 79. The carrier 46 begins to rise in a level state as it is pushed into the housing 10 by closure of the door 13 due to the reaction of the curved cam surface 115 on the carrier against the angular surface 118 on ramp 113. Concurrently, connector 66 rises and opposes the force of spring 129 and opposes the force of the inwardly moving carrier 46 as well. By the time the boiler tray 45 seals against steam chamber cover member 51, the boiler tray 45 and connector 66 are fully connected.

Figure 10:
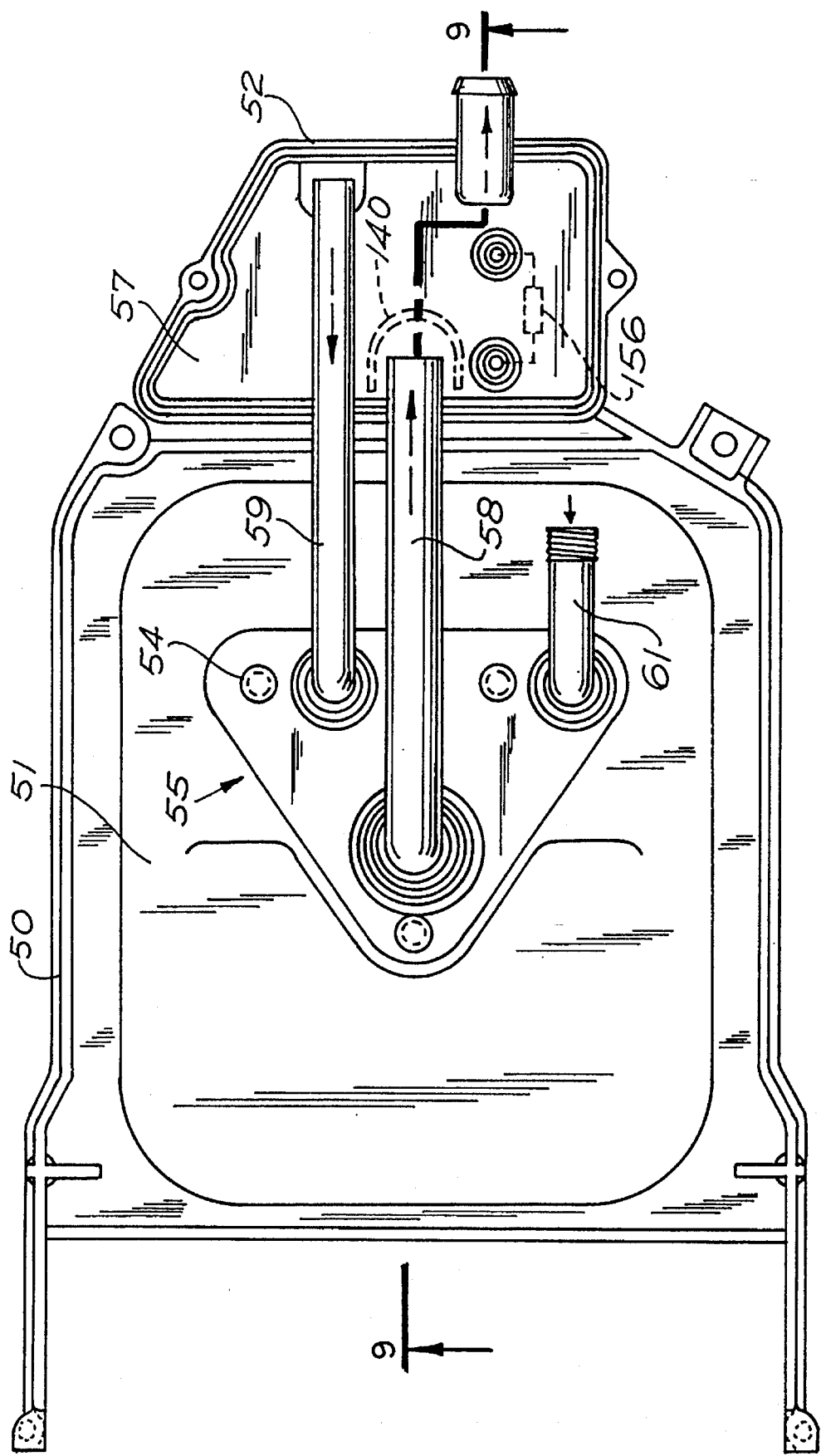
FIG. 10 is a top plan view of the steam chamber showing the boiler cover member, the tube manifold, the support shroud and the demister of the distiller.

FIG. 10 shows in dashed lines a generally semi-circular baffle 140 in the demister against which the steam discharging from tube 58 impinges for the purpose of absorbing the kinetic energy of the microglobules of water so they are induced to separate from the steam and to collect in the bottom of the demister chamber 52. Of course, the demister 52 is substantially cooler than the steam chamber which also encourages the globules or mist to drop out of suspension from the steam.

In FIG. 9, one may see that the steam and mist, if any, is conducted through a check valve 141 interposed between the steam chamber 105 and steam outlet tube 58. The check valve is disclosed in the patents of the assignee cited earlier in this specification. The ball 142 in the check valve is presently seated which is the case when no steam pressure has developed in steam chamber 105. When steam pressure develops in chamber 105 it lifts the ball 142 and steam passes the check valve and is conducted through tube 58 to demister 52. The steam passes through to the check valve through the side opening 143 of a baffle 144 which inhibits the passage of microglobules of water or mist that may rise in the steam from boiler tray 45 due to vigorous boiling of the water in the tray.

Figure 12:
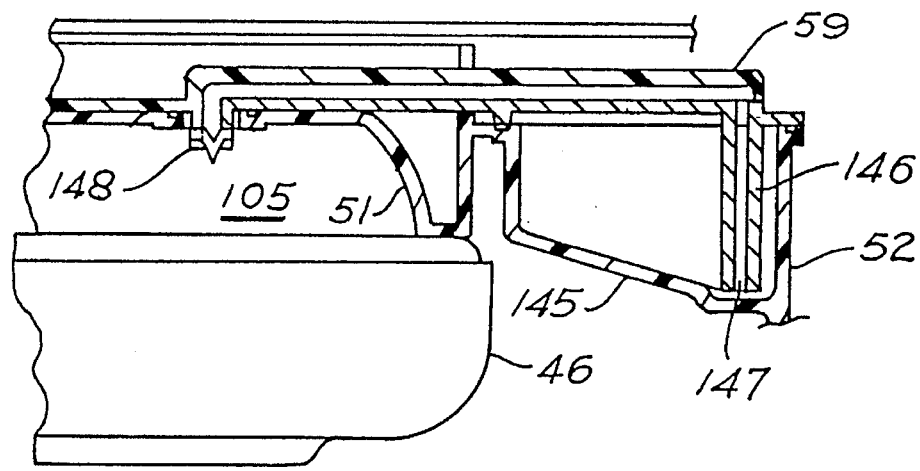
FIG. 12 is a vertical sectional view through a portion of the boiler cover member and tube manifold for illustrating how condensate is returned from the demister to the boiler tray.

The steam strikes the baffle 140 in the demister as it is being discharged from tube 58. The water particles in the steam by colliding with the baffle will drop down and flow to the lowest part of the demister 52 chamber. According to the invention, condensate collected in the demister is returned to the steam chamber 105 coincident with the time that replenishment water is supplied to the boiler tray. For this purpose, a vertical conduit 146 in the demister has its lower open end 147 terminating in the lowest part of the demister where the condensate collects. Vertical conduit 146 connects to horizontal tube 59 on the tube manifold as shown in FIGS. 10 and 12. In FIG. 12, it will be evident that tube 59 is terminated in the steam chamber 105 with a check valve 148. Check valve 148 permits flow of steam into chamber 105 but closes securely under the influence of steam pressure in chamber 105 so steam is limited to leaving chamber 105 only through the other previously discussed check valve 141.

The circumstances under which condensate is withdrawn from demister 52 and returned to boiler tray 45 are as follows. In operating cycle after operating cycle when most of the water is evaporated from the boiler tray it must be replenished. At the time infeed of raw water is initiated, steam chamber 105 contains steam at some pressure above atmospheric pressure. When solenoid water infeed valve 63 in FIG. 2 opens, there is an infeed of cool raw water to steam chamber 105 which condenses the steam for a short interval, thereby causing chamber 105 to attain a negative pressure relative to the pressure existing within demister 52. This negative pressure seats the ball in steam discharge check valve 142 so the suction due to negative pressure is not short circuited by steam outlet tube 55. However, the negative pressure in the steam generator 105 allows check valve 148 to open so condensate drawn from demister 52 can flow into the steam chamber 105. Use of the second check valve 148 in the condensate return tube 59 may be avoidable but use thereof is preferable.

A short time after replenishing water is admitted to the boiler tray 45, positive steam pressure develops in the chamber 105, check valve 142 opens and check valve 148 closes. Then the evaporation cycle continues.

The raw water infeed tube 60 on the tube manifold 55 is shown in FIG. 10 and in FIG. 2. It has been mentioned previously that infeed of raw water is regulated insofar as flow rate concerned by a flow restrictor 62 and is started and stopped by electrically operated valve 63 under the control of the microprocessor based controller 30. Overflow protection is provided in the demister and steam chamber by the use of preferably stainless steel electrode pins 150 and 151 which are embedded in electrically non-conducting plastic bosses in the demister cover as shown in FIG. 9. Tips 154 and 155 of electrode pins 150 and 151 are recessed so they will only be wetted if water rises in the demister 52 sufficiently for the demister to fill. Because the tips are set back or recessed in the bosses, the tips will only be wetted if water rises up to the full level in the demister 52. A resistor 156 is connected between electrode pins 150 and 151.

The voltage drop between the two screws 150 and 151 is measured continuously when steam is passing through the demister 52. A certain voltage drop is sensed between the electrode pins. If the demister should fill with water the gap between the electrode pins 150 and 151 would be bridged by carryover water so the voltage drop changes. Water then constitutes one conductive path between the electrode pins and resistor 156 constitutes the other path. Water and the resistor 156 comprise a parallel circuit whose total resistance is necessarily less than the resistance of the lowest resistance path. The resulting voltage drop change is detected by the microprocessor in controller 30 which responds by issuing a signal to attract the attention of the user of the distiller. The demister 52 might fill with carryover water if the ball in check valve 148 sticks on its seat, or if the steam chamber valve 142 fails to close so there is no vacuum developed in the steam chamber when cool raw water is fed in.

Figure 11:
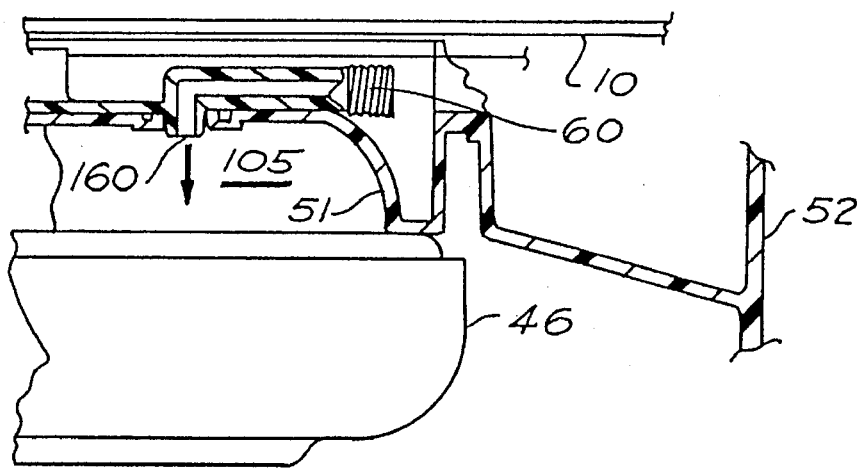
FIG. 11 is a vertical section through a portion of the boiler cover member and tube manifold for illustrating how the raw infeed water discharges into the boiler tray.

The raw water infeed tube 60 on tube manifold 56 has been identified previously in reference to FIGS. 2 and 10. How infeed tube 60 is positioned is exhibited in FIG. 11. The arrow indicates flow direction of raw water into fragmentarily shown steam chamber.

The phenomena incidental to use of the three level or three step boiler tray will now be discussed. Assume that the distiller has not been used before so that boiler tray 45 is empty and that raw infeed water is available. The electric power is turned on and nothing happens until the temperature sensor in probe 79 ultimately detects that the boiler tray 45 has been preheated to about 120° C. When this condition is met, controller 30 causes solenoid controlled water infeed valve 64 to open and deliver water through flow restrictor 63 to boiler tray 45. The heater element is turned off concurrently with opening of infeed valve 64. In the preferred embodiment of the invention, raw infeed water is fed to the boiler tray during a predetermined time interval since flow restrictor 63 governs the flow rate. Time and flow rate are related such that a definite known quantity of water is supplied to the multiple level boiler tray 45. By way of example, and not limitation, water is fed to the boiler tray at the rate of 15 ml per second in the actual model of the distiller. If the time interval is 7 seconds, for example, about 105 ml will enter the boiler tray. Means are provided for driving the heater element at various power levels, up to 500 watts for example. When the fill cycle ends, the distiller goes into the 100% power level mode and starts boiling the water to make steam which is fed through the inlet 602 of the condenser 35. As boiling proceeds, the water level in boiler tray 45 drops and the first thing that happens is that the highest or first level step 69 in the boiler tray becomes dry. Water, however, continues to boil on the intermediate level or step 71 and on the lowest level or step 73 as those levels are identified in the boiler tray depicted in FIG. 8. As long as there is water on the second level 71, the highest or first level or step 69 and the second or intermediate level step 71 stay at about 100° C. because of the cooling effect on the tray of water boiling at substantially atmospheric pressure on the second level 71 as well as on the third step or level 73. As steam production continues the intermediate step 71 eventually becomes devoid of water and its temperature starts to rise. Water continues to boil in the recessed bottom or the lowest level step 73, but the water at that level is sufficiently isolated thermally from the dry intermediate step and the first or highest step in the bottom of the tray so that the temperature of the highest level step begins to rise rather rapidly when dry. However, the residual water in the lowest or third level 73, even though it is boiling, keeps the second 71 and first 69 levels or steps at a little more than 100° C. The temperature sensor in probe 128, which resides under the highest level step 69 in the boiler tray, senses this small increase over 100° C. and signals controller 30 to open the raw water infeed valve 64 and to turn the heater off. As explained earlier, water is then fed into the boiler tray 45 for a pre-determined time interval after which the controller causes the valve 64 to close. The discharge nozzle 160 (FIG. 11) of the water infeed tube 60 is so positioned that the water is discharged onto the intermediate level step 71 on the boiler tray 45. One reason for this is that it is desirable to equalize the temperature throughout the boiler tray and, essentially, to cool the highest level 69 in the tray so the temperature sensor in probe 128 detects a temperature corresponding with the boiling temperature of water. When the raw infeed water lands on intermediate level step 71, there is a momentary pressure surge or spike that is milliseconds long. The duration of the spike and, hence, the energy involved is relatively small such that the accompanying surge in pressure within the steam chamber 105 can be relieved through the check valve 141 to the condenser. Since water is flowing into the boiler tray 45 at this time the steam prevailing in boiler chamber 105 condenses such that for a period of at least 2 and probably 5 seconds a negative pressure develops inside of the chamber 105. Development of negative pressure does not begin until after the heater element is turned off. This seats the ball 142 of check valve 141. At the end of the 2–5 second negative pressure interval, incoming water absorbs heat from the metal mass constituting the boiler tray 45 which acts as a massive heat sink. It is better to absorb this heat for a useful purpose than to let it be propagated out of the boiler tray and carrier 46. During the seconds long interval when negative pressure exists in the steam chamber 105, the negative pressure is propagated to the interior of demister 52 such that the separated condensate is drawn by the negative pressure through vertical conduit 146 and horizontal tube 59 and then through check valve 148 so the condensate that has been accumulated in the demister is returned to the boiler tray 45. The check valve 148, depicted in FIG. 12, is so positioned that the water withdrawn from the demister 52 is also directed onto the intermediate level step 71 in the boiler tray bottom. Thus, flashing of the demister return water into steam is further prevented from developing a pressure spike of significant duration.

The heater element is not turned on again until the boiler tray temperature has dropped to about 105° C. Then, the boiler tray continues in its steam producing mode until infeed water is called for again as a result of levels 69 and 71 having had all water evaporated from them.

Figure 13:
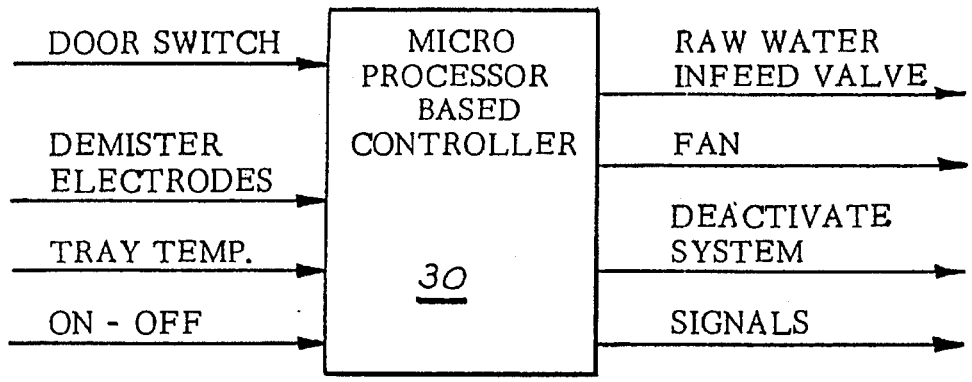
FIG. 13 is a simplified diagram of the controller.

The circuitry associated with microprocessor based controller 30 can be devised by an experienced designer. The circuit shown in U.S. Pat. No. 5,188,710 is suggestive. This patent is incorporated herein by reference. The functions of main interest, insofar as the invention disclosed herein is concerned are shown in the FIG. 13 block diagram hereof. There is a door switch signal input to the controller. If the housing door 133 is open the controller deactivates the system. The door is latched closed until boiler tray 45 is cool enough to handle. There is a boiler tray temperature signal input to controller 30 which has been discussed in detail earlier. The voltage drop across demister electrodes 154, 144 is another input to the controller. A voltage change may signal a high water level which can result in an audible or visible signal that indicates the existence of this condition. Some of the other input and output signals incidental to distiller functions are mentioned in U.S. Pat. No. 5,188,710.

It is claimed:

1. A water distiller comprising:

a boiler chamber having an inlet for raw water and an outlet for steam, means for heating the boiler chamber to boil water and thereby produce steam in the boiler chamber at a pressure above atmospheric pressure with mist in the steam, a demister comprised of a demister chamber having an inlet for steam entraining mist from said boiler chamber and having an outlet for said steam from which the mist is separated, and remains in the demister chamber as condensate, a first check valve having an inlet coupled to the boiler chamber for receiving from said boiler chamber steam above atmospheric pressure that entrains mist produced in the boiler chamber and having an outlet coupled to said inlet of the demister chamber, the first check valve being operative to open in response to steam under pressure, a tube having an inlet coupled to the demister chamber for receiving said condensate separated from the steam in the demister chamber and having an outlet coupled to the boiler chamber, a second check valve in series with the tube, said second check valve being operative to close in response to said steam above atmospheric pressure existing in the boiler chamber and to open in response to vacuum existing in the boiler chamber, a temperature sensor operative to produce a signal indicative of the need for raw water replenishment in said boiler and a controller responsive to said signal by controlling said infeed valve to open to admit raw water to said boiler chamber and to close, means for creating vacuum in the boiling chamber comprising raw water infeed valve having an inlet for raw water and an outlet coupled to the boiler chamber inlet for raw water, wherein opening of said water infeed valve when said steam at above atmospheric pressure is present in the boiler chamber to admit water that is cooler than steam into the boiler chamber causes said steam to condense in the boiler chamber to thereby create the vacuum in the boiler chamber such that the first check valve closes under influence of said vacuum and the second check valve opens under the influence of said vacuum to effect drawing condensate from the demister chamber through the tube into the boiler chamber under the influence of the vacuum.

2. The distiller according to claim 1 wherein said demister chamber has a bottom and a tubular member having a lower condensate input end opening proximate to the bottom and an upper end connected in series with said tube.

3. The distiller according to claim 1 or 2 including a baffle member in said demister chamber, the baffle member having a concave surface, and said inlet to said chamber for steam entraining mist from said boiler chamber is arranged to direct the steam against the concave surface of the baffle member.

4. The distiller according to claim 3 wherein said concave surface is substantially semi-circular.

5. A water distiller comprising:

a boiler chamber having an inlet for raw water and an outlet for steam, means for heating the boiler chamber to boil water and thereby produce steam under pressure, a demistar comprised of a demister chamber having an inlet for steam from said boiler chamber and having an outlet for steam, a first check valve having an inlet coupled to the boiler chamber for receiving steam produced in the boiler chamber and having an outlet coupled to said inlet of the demister chamber, said first check valve opening in response to steam pressure in the boiler chamber, a second check valve having an inlet coupled to the demister chamber for receiving condensate separated from the steam in the demister chamber and having an outlet coupled to the boiler chamber, said second check valve closing in response to steam pressure in the boiler chamber, means for creating vacuum in the boiler chamber comprising raw water infeed valve having an inlet for raw water and an outlet coupled to the boiler chamber inlet for raw water, wherein opening of said water infeed valve when steam is present in the boiler chamber to admit water that is cooler than steam into the boiler chamber causes steam to condense in the boiler chamber to thereby create the vacuum in the boiler chamber such that said first check valve closes and said second check valve opens in response to said vacuum to effect drawing condensate from the demister chamber into the boiler chamber under the influence of the vacuum, a temperature sensor operative to produce a signal indicative of the need for raw water replenishment in said boiler and a controller responsive to said signal by controlling said infeed valve to open to admit raw water to said boiler chamber and to close, at least two electrodes arranged with a gap between them in the demister chamber, said controller including means for detecting the voltage drop between said electrodes when steam is passing through said demister chamber and said controller further responding to a change in the voltage drop due to water rising in said demister chamber sufficiently to bridge the gap between said electrodes by issuing a signal.

6. The distiller according to claim 5 wherein said demister chamber has a bottom and said electrodes are mounted in said demister chamber in a member positioned above the bottom comprised of insulating material with a surface on each electrode set back in a downwardly opening recess in said material to assure that only a water rising to a level in the demister chamber sufficiently high to enter the recess can bridge the gap between electrodes.

7. A water distiller comprising:

a boiler chamber having an inlet for raw water, means for heating the boiler chamber to generate steam at above the atmospheric pressure in the boiler chamber, a demister comprised of a demister chamber having an inlet for receiving from the boiler chamber steam that contains mist and having an outlet for steam from which the mist is removed as condensate that accumulates in the demister chamber, a first check valve having an inlet coupled to the boiler chamber and an outlet coupled to the inlet of the demister chamber, the check valve opens in response to the pressure of steam at above atmospheric pressure in the boiler chamber for passing steam that entrains mist to the inlet of the demister chamber and for closing in response to occurrence of a vacuum in the steam chamber, a second check valve having an inlet in communication with condensate in the demister chamber and an outlet coupled to said steam chamber, the second check valve closes under the influence of steam above atmospheric pressure in the boiler chamber, means for creating vacuum in the boiling chamber comprising raw water infeed valve having an inlet for raw water and an outlet coupled to the boiler chamber inlet for raw water, wherein opening of said raw water infeed valve when steam at above atmospheric pressure exists in said boiler chamber causing the steam to condense and create the vacuum in the boiler chamber that causes the first check valve to close and causes the second check valve to open to draw the condensate from the demister into the boiler chamber.

8. A method of distilling water comprising the steps of:

heating raw water in a boiler chamber to produce steam and mist at above atmospheric pressure therein, conducting steam entraining mist to a demister chamber through a steam exiting check valve that opens in response to steam pressure in the boiler chamber, converting the mist to condensate in the demister chamber, separating steam from the condensate, conducting steam separated from condensate in the demister chamber to a condenser for producing distilled water while condensate accumulates in the demister chamber, admitting raw water into said boiler chamber periodically for replenishing water converted to steam and for condensing the steam in the boiler chamber to create a vacuum therein, such that said steam exiting check valve closes, positioning a conduit with an inlet exposed to the condensate in the demister chamber and an outlet in communication with the boiler chamber with a check valve in the conduit opening in response to vacuum existing in the boiler chamber to draw condensate in the demister chamber into the boiler chamber.

* * * * *